United States Patent
Nishijima et al.

(10) Patent No.: US 7,635,520 B2
(45) Date of Patent: Dec. 22, 2009

(54) CHLORINATED PROPYLENE RANDOM COPOLYMER AND COMPOSITIONS CONTAINING THE SAME

(75) Inventors: Eiji Nishijima, Yamaguchi (JP); Koji Masumoto, Yamaguchi (JP); Takayuki Hirose, Yamaguchi (JP); Naosuke Komoto, Yamaguchi (JP); Hironori Muramoto, Yamaguchi (JP); Kensho Okayama, Yamaguchi (JP)

(73) Assignee: Nippon Paper Chemicals Co., Ltd., Tokyo (JP)

( * ) Notice: Subject to any disclaimer, the term of this patent is extended or adjusted under 35 U.S.C. 154(b) by 302 days.

(21) Appl. No.: 11/597,916

(22) PCT Filed: May 31, 2005

(86) PCT No.: PCT/JP2005/009991

§ 371 (c)(1),
(2), (4) Date: Nov. 29, 2006

(87) PCT Pub. No.: WO2005/116093

PCT Pub. Date: Dec. 8, 2005

(65) Prior Publication Data

US 2007/0224435 A1    Sep. 27, 2007

(30) Foreign Application Priority Data

May 31, 2004    (JP)    ............................ 2004-162404
May 31, 2004    (JP)    ............................ 2004-162408

(51) Int. Cl.
B32B 27/00    (2006.01)
C08L 23/00    (2006.01)
C08L 23/04    (2006.01)
C08F 259/02   (2006.01)
C08F 265/02   (2006.01)
C08F 267/02   (2006.01)

(52) U.S. Cl. ...................... 428/421; 525/240; 525/292; 525/301

(58) Field of Classification Search ................ 525/244, 525/333.7, 418, 78
See application file for complete search history.

(56) References Cited

U.S. PATENT DOCUMENTS

| | | | |
|---|---|---|---|
| 2004/0249074 A1* | 12/2004 | Kashihara et al. | 525/78 |
| 2005/0171271 A1* | 8/2005 | Fujino et al. | 524/543 |
| 2006/0025533 A1* | 2/2006 | Komoto et al. | 525/244 |
| 2007/0010630 A1* | 1/2007 | Aburatani et al. | 525/333.7 |

FOREIGN PATENT DOCUMENTS

| | | | |
|---|---|---|---|
| EP | 1 403 315 | | 3/2004 |
| JP | 57 36128 | | 2/1982 |
| JP | 63 36624 | | 7/1988 |
| JP | 5 209006 | | 8/1993 |
| JP | 7 18016 | | 1/1995 |
| JP | 8 6009 | | 1/1996 |
| JP | 2 769 958 | | 4/1998 |
| JP | 3 045 498 | | 3/2000 |
| JP | 2001 206914 | | 7/2001 |
| JP | 2003 321588 | | 11/2003 |
| JP | 2003 327761 | | 11/2003 |
| JP | 2004 161952 | | 6/2004 |
| JP | 2005 97328 | | 4/2005 |
| WO | 90 12656 | | 11/1990 |
| WO | 03 002659 | | 1/2003 |
| WO | WO 03/002659 | * | 1/2003 |
| WO | WO 03/057778 | * | 7/2003 |
| WO | WO 03/074606 | * | 9/2003 |
| WO | 2005 021603 | | 3/2005 |

* cited by examiner

*Primary Examiner*—Melvin C Mayes
*Assistant Examiner*—Michael Forrest
(74) *Attorney, Agent, or Firm*—Oblon, Spivak, McClelland, Maier & Neustadt, L.L.P.

(57) ABSTRACT

A novel binder resin which attains good adhesion to various substrates such as polyolefin resins, vinyl chloride resins, polycarbonate resins, polyethylene terephthalate resins, acrylonitrile/butadiene/styrene resins, and nylon resins even by low-temperature baking and has excellent solubility in solvent. Namely, a chlorinated propylene random copolymer produced by subjecting a propylene random copolymer which is obtained by copolymerizing propylene with other alpha-olefins by using a metallocene catalyst as the polymerization catalyst and which has a melting point (Tm) of less than 115° C. as determined with a differential scanning calorimeter (DSC) to thermally kneaded preferably at a temperature ranging from the melting point of the copolymer to 350° C. and chlorination successively.

29 Claims, No Drawings

CHLORINATED PROPYLENE RANDOM COPOLYMER AND COMPOSITIONS CONTAINING THE SAME

TECHNICAL FIELD

The present invention relates to chlorinated propylene-based random copolymers and compositions containing the same. More particularly the present invention relates to copolymers suitable to application for decorations, paints, inks for printing, adhesives, primers, binders, and the like which are excellent in adhesion strength and other properties for polyolefin-based, polyvinyl chloride-based, polycarbonate-based, PET-based, ABS-based and nylon-based sheets, films and configured articles, and compositions containing the same.

BACKGROUND ART

Plastics are widely used in late years as materials for automobile parts, electric parts and building materials because they have lots of advantages such as light weights, rust resistance and wide flexibility of design. In particular, polyolefin-based resins are widely used as industrial materials because they have many excellent properties such as low cost, formability, chemical resistance, heat resistance, water resistance, and electric characteristics, and their demand growth in future market is also expected. However, polyolefin-based resins are non-polar and crystalline, so that difficulty in adhesion also arises in contrast to polar synthetic resins.

To address these disadvantages, as a pre-treatment of coating and adhesion, the surface of configured articles is activated by plasma treatment or gas flame treatment. Alternatively, a primer (adhesion promoter) whose main component is chlorinated polyolefin is applied.

As a primer for coating polypropylene bumpers of automobiles, for example, primer compositions whose main component is chlorinated modified polyolefin are disclosed (Patent Documents 1 and 2). These primers formed of chlorinated resins are excellent in adhesion strength to conventional polyolefin. However, some of the substrates which have recently appeared do not sufficiently adhere because of high rigidity of the substrates and low temperature baking performed thereon. Thus, in the state of art, the conventional chlorinated polyolefin resins can not sufficiently deal with the new substrates. In addition, the chlorinated polyolefin resins exhibit relatively good adhesion strength to the polypropylene substrates, but have insufficient adhesion strength to other substrates (polyvinyl chloride, polycarbonate, PET, ABS, nylon).

The chlorinated polyolefin resins proposed hitherto have as the main component a chlorinated isotactic polypropylene (IPP) produced by a Ziegler-Natta catalysis polymerization, and then chlorinating IPP. On the contrary, there are disclosed adhesives using chlorinated syndiotactic polypropylene (SPP) produced by a metallocene catalysis polymerization, and then chlorinating SPP (Patent Documents 3 and 4). Although this chlorinated SPP are superior in solubility in solvent compared with the chlorinated IPP produced by Ziegler-Natta catalysis polymerization, the chlorinated SPP has a weakness that it exhibits such an excellent adhesion strength to only the polypropylene substrates and insufficient adhesion strength to the other substrates (e.g., polyvinyl chloride, polycarbonate, PET, ABS, nylon).

In order to address these problems, development is being made aiming at exhibiting excellent adhesion strength under a condition of the low temperature baking at 80° C. (Patent Document 5). However, further lowering the baking temperature is demanded in recent years. It has been recently revealed that sufficient results are not always obtained when the baking temperature is lowered to 60° C. or below.

Although the chlorinated resin has conventionally been used in a form of a solution in an aromatic organic solvent such as toluene and xylene, recently there have been made an attempt to use aqueous solution in order to address environmental problems and safe hygiene (Patent Documents 6, 7, 8 and 9). However, these waterborne resins require numerous energy and time for drying and baking steps after applying the resins onto the substrates, when compared with organic solventborne resins. To solve this problem, there is an increasing demand for a high-solid chlorinated resin waterborne dispersion which can be used in low temperature baking.

Polyolefin substrates tend to be having high rigidity recently. The waterborne dispersion of conventional chlorinated resin can not exhibit sufficient adhesion strength to such a substrate, and thus it is becoming difficult to ensure sufficient adhesion with such a substrate. Furthermore, for application on the automobile parts, there is also a demand for gasohol resistance, and it is therefore more difficult to ensure applicability.

As one of means to deal with the low temperature baking, lowering of a softening temperature of a raw polypropylene is effective. However, in the conventional polymerization using the Ziegler-Natta catalyst, it is necessary to increase a composition ratio of ethylene or other α-olefins in order to lower the softening temperature. As a result, the properties such as adhesion strength and gasohol resistance are decreased. If a molecular weight of the chlorinated resin is increased in order to compensate the decrease of properties, it is not well-emulsified or dispersed due to the increased melt viscosity during production of the waterborne composition. Due to the high viscosity of the final product, such a strategy is not suitable for obtaining a high-solid product.

Conventional copolymers of polypropylene or propylene with ethylene or other α olefins have a broad molecular weight distribution, and a broad molecular weight distribution after acid modification and chlorination as well. Existence of relatively low molecular weight components reduces adhesion strength and solvent resistance. Particularly, the gasohol resistance is remarkably deteriorated. In order to improve this defect, it is necessary to remove low molecular weight components by extracting the same in solvents, which is uneconomical.

Meanwhile, syndiotactic polypropylene (SPP) produced with a metallocene catalyst is characterized by having low softening temperature and narrow molecular weight distribution, and the technology of the primer composed of the chlorinated resin using this SPP is disclosed (Patent Document 3). However, sufficient adhesive strength is not obtained because most of substrates contain as a main component isotactic polypropylene (IPP) that is produced with the Ziegler-Natta catalyst.

As explained above, with the waterborne dispersion composed of the conventional chlorinated resin, it was not possible to obtain good adhesive strength and gasohol resistance with ensuring applicability to high solidification and low temperature baking.

In order to address such problems in the waterborne dispersion, the technology is being developed to achieve excellent adhesion strength in the low temperature baking condition at 80 to 90° C. (e.g., patent Document 10). However, in recent years, there is a further demand for lowering of the baking temperature of the waterborne dispersion. It has been recently revealed that satisfied results are not always obtained when the baking temperature is lowered to, e.g., 60° C. or below.

Patent Document 1: JP-S57-36128 A
Patent Document 2: JP-S63-36624 B
Patent Document 3: JP-3045498 B
Patent Document 4: JP-H7-18016 A
Patent Document 5: JP-2003-321588 A
Patent Document 6: JP-H8-6009 B
Patent Document 7: JP-H5-209006 A
Patent Document 8: JP-2769958 B
Patent Document 9: WO90/12656 Pamphlet
Patent Document 10: JP-2003-327761 A
Patent Document 11: JP-2001-206914 A

DISCLOSURE OF INVENTION

Problem to be Solved by the Invention

It is an object of the present invention to provide a polymer which sufficiently adheres to a poorly-adherent substrates such as olefin-based, vinyl chloride-based, polycarbonate-based, PET-based, ABS-based and nylon-based substrates containing a polypropylene material even at a low temperature baking temperature of less than 80° C., and which has excellent gasohol resistance and solubility in solvent. It is a further object of the present invention to provide an organic solventborne or waterborne composition containing the same.

Means for Solving Problem

Inventors of the present application performed co-polymerization of propylene with another α-olefin using a metallocene catalyst as a polymerization catalyst to obtain a propylene-based random copolymer having a melting point (Tm) of less than 115° C. when measured using a differential scanning calorimeter (DSC), and chlorinated the copolymer to obtain a chlorinated propylene-based random copolymer, with which the inventors solved the aforementioned problems.

According to the present invention, the following [1] to [18] are proposed.

[1] A chlorinated propylene-based random copolymer obtained by chlorinating a propylene-based random copolymer: said propylene-based random copolymer being obtained by copolymerizing propylene with another α-olefin using a metallocene catalyst as a polymerization catalyst; and said propylene-based random copolymer having a melting point (Tm) of less than 115° C. when measured using a differential scanning calorimeter (DSC).

[2] The chlorinated propylene-based random copolymer according to [1] wherein said propylene-based random copolymer is chlorinated after lowering a molecular weight thereof by heating at not less than the melting point of the propylene-based random copolymer and not more than 350° C.

[3] The chlorinated propylene-based random copolymer according to [1] wherein said propylene-based random copolymer is graft-copolymerized with α,β-unsaturated carboxylic acid and/or anhydride thereof so that a graft amount is 0.1 to 20% by weight.

[4] The chlorinated propylene-based random copolymer according to [3] wherein the copolymer after said graft copolymerization is chlorinated.

[5] The chlorinated propylene-based random copolymer according to [1] wherein a chlorine content thereof is 2 to 35% by weight.

[6] The chlorinated propylene-based random copolymer according to [1] having a weight average molecular weight of 3,000 to 250,000.

[7] An adhesive comprising the chlorinated propylene-based random copolymer according to [1] or [3].

[8] A primer comprising the chlorinated propylene-based random copolymer according to [1] or [3].

[9] A binder comprising the chlorinated propylene-based random copolymer according to [1] or [3].

[10] A binder for an ink comprising the chlorinated propylene-based random copolymer according to [1] or [3].

[11] An organic solventborne resin composition comprising the chlorinated propylene-based random copolymer according to any one of [1] to [6], a stabilizer and an organic solvent.

[12] A waterborne resin composition comprising the chlorinated propylene-based random copolymer according to any one of [3] to [6], water and a surfactant.

[13] A configured resin article comprising a configured resin substrate and a coating film layer, said layer containing one or more chlorinated propylene-based random copolymers selected from the group consisting of the following (A) and (B), and a paint component: (A) a chlorinated propylene-based random copolymer obtained by chlorinating a propylene-based random copolymer, said propylene-based random copolymer being obtained by copolymerizing propylene with another α-olefin using a metallocene catalyst as a polymerization catalyst, and said propylene-based random copolymer having a melting point (Tm) of less than 115° C. when measured using a differential scanning calorimeter (DSC); and (B) the chlorinated propylene-based random copolymer of (A) having a molecular structure in which α,β-unsaturated carboxylic acid and/or anhydride thereof has been graft-copolymerized so that a graft amount is 0.1 to 20% by weight.

[14] The configured resin article according to [13] wherein said coating film layer is a laminated article comprising a primer layer formed of the chlorinated propylene-based random copolymer selected from the group consisting of said (A) and (B), and a paint component layer formed of the paint component.

[15] The configured resin article according to [13] wherein said configured resin substrate is a substrate formed of a resin selected from the group consisting of polyolefin resins, vinyl chloride resins, pblycarbonate resins, polyethylene terephthalate resins, acrylonitrile butadiene styrene resins and nylon resins.

[16] A method for producing a chlorinated propylene-based random copolymer comprising: copolymerizing propylene with another α-olefin using a metallocene catalyst as a polymerization catalyst to obtain a propylene-based random copolymer having a melting point (Tm) of less than 115° C. when measured using a differential scanning calorimeter (DSC); and chlorinating said propylene-based random copolymer.

[17] The method for producing a chlorinated propylene-based random copolymer according to [14] comprising a step of graft-copolymerizing α,β-unsaturated carboxylic acid and/or anhydride thereof with said propylene-based random copolymer so that a graft amount is 0.1 to 20% by weight, at least before or after said step of chlorinating.

[18] A method for low temperature baking wherein a composition comprising the chlorinated propylene-based random copolymer according to any one of [1] to [6] is applied onto a configured resin substrate and baked at 80° or below.

Effect of the Invention

The chlorinated propylene-based random copolymer of the present invention is in a good liquid state even with a low chlorine content, exhibits excellent adhesion strength and gasohol resistance in any of application as primer, adhesive and ink even in low temperature baking.

In the propylene-based random copolymer produced using a conventional Ziegler-Natta catalyst as a polymerization catalyst, it is necessary to significantly increase a ratio of α-olefin for lowering its melting point. As a result, adhesion strength to polyolefin substrate is significantly lowered. On the contrary, the propylene-based random copolymer may have a low melting point when produced using a metallocene polymerization catalyst with addition of a very small amount of α-olefin. It is considered that, even when the chlorine content is relatively low, the propylene-based random copolymer thereby exhibits the excellent solubility in solvent and exhibit excellent thermal deformation property and adhesion strength even in the low temperature baking. One of the feature of the propylene-based random copolymer produced using a metallocene polymerization catalyst is a far narrower molecular weight distribution than those produced using a Ziegler-Natta polymerization catalyst. This is considered as one of factors to exhibit excellent adhesion strength upon low temperature baking.

When α,β-unsaturated carboxylic acid and/or anhydride thereof is graft-copolymerized, organic peroxide is used. Thus, in the propylene-based random copolymer produced using Ziegler-Natta polymerization catalyst, molecular weight is inevitably lowered, i.e., low molecular weight components are produced. However, it has been newly demonstrated that low molecular weight components are scarcely produced when the propylene-based random copolymer is produced using metallocene polymerization catalysis.

In the present invention, although no clear reason was not given, it has been found out that the propylene-based random copolymer produced using metallocene polymerization catalysis exhibits excellent adhesion strength to a wide variety of substrates such as polyvinyl chloride-based, polycarbonate-based, PET-based, ABS-based and nylon-based substrates in addition to the polyolefin substrates, differently from the propylene-based random copolymer produced using a conventional Ziegler-Natta polymerization catalyst. It seems that gasohol resistance is improved because of low content of the low molecular components in the propylene-based random copolymer produced by the metallocene polymerization catalysis.

Therefore, the copolymers and the compositions comprising the same are industrially useful as resin compositions for primers and binders, and specifically useful as the resin compositions for the purpose of protecting or decorating polyolefin resins such as polypropylene, polyethylene, ethylene propylene copolymers and ethylene propylene diene copolymers, and vinyl chloride resins, polycarbonate (PC) resins, polyethylene terephthalate (PET) resins, acrylonitrile butadiene styrene (ABS) resins and nylon resins. The copolymers and the compositions comprising the same are also useful as binder resin compositions for paints, heat sealers, printing inks, adhesives or primers, exhibiting excellent adhesion strength and other properties for use with polyolefin-based, polyvinyl chloride-based, polycarbonate-based, PET-based, ABS-based and nylon-based sheets, films and configured articles.

Containing the carboxyl group-containing chlorinated propylene-based random copolymer, the waterborne dispersion of the present invention exhibits excellent adhesion strength to polyolefin substrates even under the low temperature baking condition, and is excellent in gasohol resistance and water resistance. The waterborne dispersion of the present invention also exhibits excellent adhesion strength to various substrates, and keeps good dispersive state.

Therefore, the waterborne dispersion of the present invention, which contains the carboxyl group-containing chlorinated propylene-based random copolymer, is a stable liquid even if containing a chlorinated resin having a lower chlorination degree and/or a higher molecular weight. The waterborne dispersion of the present invention is also a useful resin which exhibits the excellent properties even at the low temperature baking condition, and is in particular useful as primers, paints, inks and adhesives.

BEST MODES FOR CARRYING OUT THE INVENTION

A propylene-based random copolymer which is a raw material of the present invention is a copolymer obtained by copolymerizing propylene which is the main component with other α-olefins as a comonomer, with use of a metallocene catalyst as a polymerization catalyst. As the comonomer α-olefin, one or more may be selected from the group consisting of ethylene or olefin having 4 or more carbon atoms. Examples of olefins having 4 or more carbon atoms may include 1-butene, 1-hexene, 4-methyl-1-pentene and 1-octene. In the present invention using metallocene catalysis, the variety of the copolymerizable comonomers may be much more than that of the process using a Ziegler-Natta catalyst.

As the metallocene catalyst used in the present invention, those known publicly may be used. Specific examples of the desirable catalyst may be those obtained by combining the following components (A) and (B) and, if necessary, (C):

Component (A): a metallocene complex containing a transition metal in IV to VI groups in the periodic table, coordinated with one or more conjugate 5-membered ring as a ligand;

Component (B): an ion exchangeable lamellar silicate salt; and

Component (C): an organic aluminum compound.

The propylene-based random copolymer used for the present invention may be produced by publicly known methods (e.g., described in Patent Document 11). For example, the copolymer may be produced by supplying propylene, ethylene and hydrogen into a reaction tank, while continuously adding alkyl aluminum and a metallocene catalyst.

The propylene-based random copolymer used in the present invention requisitely have the melting point (Tm) measured using a differential scanning calorimeter (DSC) being less than 115° C., preferably 110° C. or below. When Tm is 115° C. or above, adhesion strength becomes insufficient if the baking is performed at a temperature of lower than 80° C. Tm obtained by DSC in the present invention is measured using a DSC apparatus supplied from Seiko Denshi Kogyo Co., Ltd., and its value is determined by measuring about 5 to 15 mg of a sample under the following measurement condition.

<DSC Measurement Condition>

Preheating: 30° C.→rising temperature (30° C./minute)→200° C.

Cooling: 200° C.→lowering temperature (−20° C./minute: liquid nitrogen)→−30° C. (retained for 5 minutes)

Main measurement: −30° C.→rising temperature (10° C./minute)→200° C.

As the propylene-based random copolymer, specifically, commercially available products such as Wintec (supplied from Japan Polychem Corporation) may be used in the present invention.

The propylene-based random copolymer used in the present invention may be a copolymer having a lowered molecular weight by applying heat at the temperature in a range of the melting point to 350°, in the presence of a radical initiator using a Banbury mixer, a kneader, an extruder, and the like; a copolymer without such a thermal treatment for lowering the molecular weight; or mixture thereof. The radical initiator used for this reaction may be appropriately selected from those known publicly, and in particular is desirably an organic peroxide compound.

When the propylene-based random copolymer used in the present invention is subjected to lowering of the molecular weight by the heat (thermal kneading), the solubility in various solvents and compatibility with other resins are improved. More specifically, with the propylene-based random copolymer used in the present invention which has been subjected to thermal kneading, the solubility in the solvents such as non-aromatic solvents becomes higher than that with the resin without the thermal kneading treatment. Although the reason for these effects is currently unclear, it is speculated that polar groups are slightly introduced onto molecular chains of the resin by heating in the presence or absence of the radical initiator. It is preferable that lowering of the molecular weight by thermal kneading may be within a range in which a dispersion degree (MW/MN) of the resin after chlorination does not exceed 2.0.

Examples of the aforementioned organic peroxide compound may include di-t-butyl peroxide, dicumyl peroxide, t-butylcumyl peroxide, benzoyl peroxide, dilauryl peroxide, cumene hydroperoxide, t-butyl hydroperoxide, 1,1-bis(t-butylperoxy)-3,5,5-trimethylcyclohexane, 1,1-bis(t-butylperoxy)-cyclohexane, cyclohexanone peroxide, t-butylperoxy benzoate, t-butylperoxy isobutyrate, t-butylperoxy-3,5,5-trimethylhexanoate, t-butylperoxy-2-ethylhexanoate, t-butylperoxyisopropyl carbonate, and cumylperoxy octanoate.

In the present invention, one species of the propylene-based random copolymer obtained as the aforementioned procedure and having Tm of less than 115° C. may be used alone. Alternatively, two or more species may be used in combination. Furthermore, those in which one or more of other kind of polyolefins such as IPP and SPP has been mixed may also be used. Depending on the intended application, IPP and SPP may be mixed up to about 30% by weight relative to the total resin.

The chlorinated propylene-based random copolymer of the present invention is obtained by introducing chlorine into the aforementioned propylene copolymer.

The chlorination reaction may be performed by dissolving the propylene-based random copolymer in a chlorocarbon solvent such as chloroform, and then bubbling gaseous chlorine with irradiating ultraviolet ray or in the presence of the organic peroxide.

The chlorine content in the chlorinated propylene-based random copolymer used in the present invention is not particularly limited, although, in terms of practical use, the content may preferably be 2 to 35% by weight and more preferably 4 to 25% by weight. When the chlorine content is less than 2% by weight, adhesion strength to various substrates becomes good, but the solubility in organic solvents tends to be lowered. When the content is 35% by weight or less, adhesion strength to various substrates may be made better. The chlorine content is a value measured in accordance with JIS-K7229.

The weight average molecular weight (Mw) of the chlorinated propylene-based random copolymer or the carboxyl group-containing chlorinated propylene-based random copolymer used in the present invention is preferably 3,000 to 250,000 and more preferably 5,000 to 220,000. When the molecular weight is not less than the aforementioned lower limit, aggregation force of the resin may become sufficient and adhesive strength may be enhanced. When the molecular weight is not more than the aforementioned upper limit, the viscosity of the resin solution may become appropriate, and handling and sprayability of the resulting inks and adhesives may become good. In addition, the resin component can be easily dispersed uniformly in the solution. Mw and Mn (number average molecular weight) in the present invention are the values measured by gel permeation chromatography (GPC, standard substance: polystyrene resin).

The propylene-based random copolymer used in the present invention is characterized in that the molecular weight distribution thereof is narrower than that of polyolefin produced using a conventional Ziegler-Natta polymerization catalyst. As one method for representing an extent of molecular weight distribution, dispersion degree (Mw/Mn) which is a ratio of weight average molecular weight (Mw) to number average molecular weight (Mn) of polymer may be used. In the case of a monodispersion, dispersion degree is 1, and dispersion degree is increased as the molecular weight distribution is expanded.

The dispersion degree of the chlorinated propylene-based random copolymer of the present invention is suitably 2.5 or less and more suitably 2 or less. When the dispersion degree is 2.5 or less, the copolymer after the chlorination has the excellent properties which were not conventionally observed, and when it is 2.0 or less, the copolymer tends to exhibit the more excellent properties. The value of the weight average molecular weight may be obtained by publicly known methods such as GPC (gel permeation chromatography) method and light scattering method. The values of the weight average molecular weight and the number average molecular weight herein are the values measured by the GPC method.

When the weight average molecular weight of the chlorinated modified polyolefin resin is in the aforementioned range of the molecular weight, the resin may exert major performances such as adhesion strength. However, the optimal range of the weight average molecular weight may be adjusted because the levels of adhesion strength required for the resin are different depending on the intended application and required natures are different.

For example, for application as the primers on plastic-based automobile parts, the weight average molecular weight is preferably 20,000 to 150,000 and more preferably 40,000 to 130,000. When the molecular weight is not less than the aforementioned lower limit, required adhesive strength may be easily obtained. On the other hand, when the molecular weight is not more than the aforementioned upper limit, the viscosity of the resin solution may become proper and the handling and the sprayability may become good if the composition is the organic solventborne composition. If the composition is the waterborne composition, a uniform dry coating film may be easily formed after baking the composition with the molecular weight being not more than the aforementioned upper limit.

In the use as the adhesives in back printing inks and heat sealers, the weight average molecular weight is preferably 50,000 to 250,000. When the molecular weight is not less than this lower limit, required adhesive strength may be easily obtained. When the molecular weight is not more than this upper limit, the viscosity may become proper, and the handling may become easy. In addition, a uniform coating film may be easily formed even in waterborne coating system.

In the use as the adhesives in film printing inks, the weight average molecular weight is preferably 5,000 to 40,000 and more preferably 10,000 to 20,000. When the molecular weight is not less than this lower limit, required adhesive strength may be easily obtained. When the molecular weight is not more than this upper limit, the compatibility with other resins of ink components may become good.

Preferable one embodiment of the present invention may include the carboxyl group-containing chlorinated propylene-based random copolymer. The carboxyl group-containing chlorinated propylene-based random copolymer of the present invention is obtainable by introducing $\alpha,\beta$-unsaturated carboxylic acid and chlorine into the aforementioned propylene-based random copolymer. The production thereof may be performed by two methods described below. That is, they are a method in which $\alpha,\beta$-unsaturated carboxylic acid or anhydride thereof is previously graft-copolymerized with the propylene-based random copolymer, and then chlorinated (first method); and a method in which the chlorination reaction is performed and then $\alpha,\beta$-unsaturated carboxylic acid or anhydride thereof is graft-copolymerized (second method). The first method tends to give the final composition having better properties.

The more specific methods for production will be described below. In the first method, graft polymerization of $\alpha,\beta$-unsaturated carboxylic acid or anhydride thereof with the propylene-based random copolymer may be performed in either the presence or absence of radical initiator, but it is preferable to use radical initiator. As the radical initiator, it is preferable to use organic peroxide such as benzoyl peroxide, dicumyl peroxide, lauroyl peroxide, di-t-butyl peroxide and cumene hydroperoxide. The type and the amount of the radical initiator to be used may be appropriately selected depending on the reaction condition, and it is desirable to use about 0.1 to 5% by weight relative to the amount of the propylene-based random copolymer (solid content). When the amount of the initiator is not less than this lower limit, reduction of the graft reaction rate may be advantageously prevented. The amount of the initiator being not more than this upper limit may prevent decrease of the graft reaction rate and occurrence of side reactions such as internal crosslinking and lowering of the molecular weight. The graft copolymerization may be performed by publicly known methods, e.g., a method in which the resin is reacted by heating to the melting point or above in the presence of the radical initiator (melting method) and a method in which the resin is dissolved in an organic solvent and then reacted by heating and stirring in the presence of a radical initiator (solution method).

The melting method is advantageous in terms of easy manipulation because the resin is reacted in a short period of time at a temperature of the melting point or above and 300° C. or below using a Banbury mixer, a kneader or an extruder.

In the solution method, it is desirable to use an aromatic solvent such as toluene and xylene as the organic solvent. In addition, ester-based solvents and ketone-based solvents may be partially mixed and used. The radical initiator used for the reaction may be appropriately selected from those known publicly, and in particular an organic peroxide compound is desirable. As the organic peroxide compound, those described above may be used.

In the solution method, when $\alpha,\beta$-unsaturated carboxylic acid or anhydride thereof is graft-copolymerized and then chlorinated, it is necessary to volatilize the solvent and replace it with a chlorination solvent such as chloroform. Therefore, the melting method is more preferable in the first method in terms of easier production process.

The subsequent chlorination reaction may be easily performed by publicly known methods. For example, the reaction is performed by dispersing or dissolving the propylene-based random copolymer with which $\alpha,\beta$-unsaturated carboxylic acid or anhydride thereof has been graft-copolymerized in a medium such as water or chloroform, and then bubbling chlorine gas thereinto in the presence of a catalyst or under the irradiation of ultraviolet ray under applied pressure or normal pressure at a temperature of 50 to 130° C. When the temperature is 50° C. or above, the uniform chlorination reaction may be easily performed and the solubility in solvent may be increased. When the temperature is 130° C. or below, lowering of the molecular weight during the chlorination seldom occurs, and adhesion strength and printing suitability may become good.

In the second method, i.e., the method in which $\alpha,\beta$-unsaturated carboxylic acid or anhydride thereof is graft-copolymerized after the chlorination reaction, the propylene-based random copolymer is dissolved in a chlorocarbon solvent such as chloroform; the chlorination reaction is performed in the same way as in the first method to produce the chlorinated propylene-based random copolymer; subsequently the solvent is replaced with a solvent such as toluene or xylene; and then $\alpha,\beta$-unsaturated carboxylic acid or anhydride thereof is graft-copolymerized in the presence of the organic peroxide compound. The reaction may be performed at a temperature of not less than 50° C. and not more than a boiling point of the solvent. However, in the second method, when the reaction temperature is not less than 50° C. and not more than 100° C., the graft polymerization degree of $\alpha,\beta$-unsaturated carboxylic acid or anhydride thereof becomes low. In the solvent having the boiling point of 100° C. or above, it is likely that the chlorinated propylene-based random copolymer causes dehydrochlorination. Thus, the first method is more preferable than the second method in terms of easy manipulation.

In the first and second method, when the propylene-based random copolymer is subjected to thermal kneading for lowering the molecular weight, the thermal degradation step may be performed at any step of the method. However, it is preferable to perform the thermal kneading step before the chlorination because otherwise the manipulation becomes complicated, e.g., the thermal kneading must be performed after solidification. The step of thermal kneading may be performed simultaneously with the step of graft-copolymerizing $\alpha,\beta$-unsaturated carboxylic acid or anhydride thereof. The process is simplified by performing them simultaneously.

In the first and second method, the order of adding $\alpha,\beta$-unsaturated carboxylic acid or anhydride thereof and the initiator and the operation for addition may be appropriately selected. At the end of the reaction, residual monomers may be eliminated under reduced pressure.

One of the feature of the present invention is that the product having the excellent properties may be obtained even if the step of removing the low molecular weight component, e.g., extraction in solvent is not performed. However, of course, the low molecular weight component may further be removed. The removal of the low molecular weight component may preferably performed after the graft copolymerization of $\alpha,\beta$-unsaturated carboxylic acid or anhydride thereof.

One purpose of graft-copolymerizing $\alpha,\beta$-unsaturated carboxylic acid or anhydride thereof with the propylene-based random copolymer is to impart adhesion strength to a top coating when the copolymer or the composition thereof of the present invention is used as, for example, the primer. In general, chlorinated polyolefin tends to have low polarity. When chlorinated polyolefin itself is used as the primer (adhesion promoter), adhesion strength to the PP substrates is good, but adhesion strength to top coating with high polarity (e.g., polyurethane paints, melamine paints) is not so high. Therefore, depending on the type of the paint to be used, it is desirable that the polarity of chlorinated polyolefin is enhanced by graft-copolymerizing α,β-unsaturated carboxylic acid or anhydride thereof.

Example of α,β-unsaturated carboxylic acid or anhydride thereof for use may include maleic acid, citraconic acid, itaconic acid, aconitic acid and anhydrides thereof, acrylic acid, methacrylic acid, fumaric acid and mesaconic acid, and maleic anhydride is the most suitable in the light of graft efficiency to polyolefin resin.

In the present invention, the amount of α,β-unsaturated carboxylic acid or anhydride thereof to be introduced by the graft copolymerization (graft amount) is preferably 0.1 to 20% by weight and more preferably 1.0 to 10% by weight relative to the amount of the raw material propylene-based random copolymer. When the graft amount is not less than this lower limit, adhesion strength may be enhanced and the good waterborne dispersion may be easily obtained. When the graft amount is not more than this upper limit, the water resistance may become better because the amount of unreacted α,β-unsaturated carboxylic acid or anhydride thereof is small. The graft amount of α,β-unsaturated carboxylic acid or anhydride thereof may be measured by an alkali titration method or an FT-IR method.

The lower the chlorine content in the carboxyl group-containing chlorinated propylene-based random copolymer is, the better adhesion strength to the polypropylene resins becomes. However, when the chlorine content is too low, thermal deformation is largely lowered. Thus, adhesion strength tends to be insufficient under the low temperature baking condition at lower than 80° C. When the chlorine content becomes high, adhesion strength to polypropylene resins tends to lower. Thus, the chlorine content is preferably 2 to 35% by weight, and more preferably is adjusted to 4 to 25% by weight. The chlorine content in the carboxyl group-containing chlorinated propylene-based random copolymer is obtained by titration in accordance with JIS-K7210.

Chlorinated polyolefin is deteriorated along with dehydrochlorination when exposed to ultraviolet ray and intense heat. When chlorinated polyolefin is deteriorated by dehydrochlorination, the resin is colorized, the properties are deteriorated, e.g., adhesion strength to polypropylene substrates is lowered, and liberated hydrochloric acid harms working environment. Thus, it is preferable to add a stabilizer. For obtaining its effect, it is preferable to add the stabilizer at 0.1 to 5% by weight relative to the resin component (solid content).

The stabilizer plays a role to prevent dehydrochlorination and trap hydrogen chloride originated from the resin of the present invention due to environmental aggravation such as high temperature so that hydrogen chloride is not released to peripheral atmosphere. As the stabilizer, epoxy compounds or compounds having an oxetane ring may be exemplified. Although the epoxy compound is not particularly limited, those compatible with the chlorinated resin are preferable. Example thereof may be an epoxy compound with an epoxy equivalent of about 100 to 500 having one or more epoxy groups in one molecule. As specific examples of the stabilizer, the following substances may be exemplified. Epoxidized soybean oil and epoxidized linseed oil obtained by epoxidizing plant oil having natural unsaturated group with peracid such as peracetic acid. Epoxidized fatty acid esters obtained by epoxidizing unsaturated fatty acid such as oleic acid, tall oil fatty acid and soybean oil fatty acid. Epoxidized alicyclic compounds typified by epoxidized tetrahydrophthalate. Condensates of bisphenol A or polyvalent alcohol with epichlorohydrin, for example, bisphenol A glycidyl ether, ethylene glycol glycidyl ether, propylene glycol glycidyl ether, glycerol polyglycidyl ether, and sorbitol polyglycidyl ether. Monoepoxy compounds typified by butylglycidyl ether, 2-ethylhexylglycidyl ether, decylglycidyl ether, stearylglycidyl ether, allylglycidyl ether, phenylglycidyl ether, sec-butylphenylglycidyl ether, tert-butylphenylglycidyl ether, and phenolpolyethylene oxide glycidyl ether. Metal soaps such as calcium stearate and lead stearate, organic metal compounds such as dibutyl tin dilaurate and dibutyl maleate, and hydrotalcite compounds, which are used as the stabilizer for polyvinyl chloride resins may also be used and they may be used in combination. The compound having the oxetane ring is the compound having one or more oxetane rings in one molecule. Examples of the compound having one oxetane ring may include 3-ethyl-3-hydroxymethyloxetane, 3-ethyl-3-(2-ethylhexyloxymethyl)oxetane, and 3-ethyl-3-(phenoxymethyl)oxetane. Examples of the compound having two or more oxetane rings may include 1,4-bis{[(3-ethyl-3-oxetanyl)methoxy]methyl}benzene, di[1-ethyl(3-oxetanyl)]methyl ether, 1,4-bis[(1-ethyl-3-oxetanyl)methoxy]benzene, 1,3-bis[(1-ethyl-3-oxetanyl)methoxy]benzene, 4,4'-bis{[3-ethyl-3-oxetanyl)methoxy]biphenyl, and phenol novolac oxetane. Those particularly preferably used among these oxetane compounds are the compounds having one oxetane ring in one molecule.

The amount of the epoxy compound or the compound having the oxetane ring to be used may be appropriately selected depending on the conditions for use, and is preferably 0.1 to 10% by weight relative to the weight of the carboxyl group-containing chlorinated propylene-based random copolymer. When the amount is not less than 0.1% by weight, sufficient effect as the stabilizer may be easily obtained. When the amount is not more than 10% by weight, the amount is economical while the deterioration of properties may be prevented. These stabilizers capture liberated hydrochloric acid generated by heat and mechanical shear when added before the emulsification step. A hydrophilic epoxy compound may also be added after the emulsification, to prevent dehydrochlorination and keep pH value constant during the storage and in use.

The copolymer resin of the present invention may also be dissolved in organic solvent for use. The concentration of the solution may be appropriately selected depending on the intended application. The resin concentration is preferably 5 to 60% by weight because coating workability may be impaired when the resin concentration is too high or too low.

As to the solution in which the chlorinated polypropylene-based random copolymer of the present invention is dissolved in organic solvent, the concentration thereof may be adjusted within the range in which workability, e.g. sprayability upon coating, is not impaired. If the composition is used for the low temperature baking method, it is preferable to make the solid content as high as possible (to be a high-solid composition) because it takes a long period of time for drying the coating film made of a paint containing the chlorinated polypropylene-based random copolymer. In order to obtain a high-solid organic solventborne solution, it is required to employ a chlorinated polypropylene-based random copolymer having high solubility in solvent. Since the chlorinated polypropylene-based random copolymer of the present invention has excellent solubility in solvent, the solid content of the composition may be heightened by about 5 to 20% higher than the composition containing a conventional chlorinated polyolefin. Therefore the present copolymer is thus suitable for obtaining a high solid composition. In particular in the case of using non-aromatic solvent, the chlorinated polypropylene-based random copolymer of the present invention is more suitable for obtaining a high solid composition than conventional ones.

As the solvent to be used, aromatic solvents such as toluene and xylene are preferable. As non-aromatic solvents, ester solvents such as ethyl acetate and butyl acetate, ketone solvents such as methyl ethyl ketone and methyl isobutyl ketone, aliphatic solvents such as n-hexane and heptane, and alicyclic solvents such as cyclohexane, methylcyclohexane and ethylcyclohexane may be used similarly to the aromatic solvents.

The copolymer resin of the present invention exhibits the excellent solubility in ethyl acetate and methyl ethyl ketone that are mainly used as non-aromatic solvents. The copolymer exhibit excellent solubility in non-aromatic solvents equivalent to one in aromatic solvent. In combination with high volatility of these non-aromatic solvents, when the composition is applied onto a substrate, the composition may be rapidly dried. Thus, the composition may be suitably used for, e.g., application under low temperature treatment such as low temperature baking, and application under solvent regulation in which negative effect to the environment is concerned. The copolymer also exhibits the excellent solubility in alcohol, and the resulting composition may have higher alcohol ratio in the solvent than conventional ones.

In addition, in order to increase the storage stability of the resin solution, it is preferable to add any alcohol such as methanol, ethanol and isopropyl alcohol, and propylene-based glycol ether such as propylene glycol methyl ether, propylene glycol ethyl ether and propylene glycol t-butyl ether alone or in combination of two or more, at 1 to 20% by weight relative to the aforementioned solvent.

Dissolved copolymer resin of the present invention in the organic solvent may be prepared by replacing the chlorination solvent such as chloroform, which is the reaction solvent, with the aforementioned solvent by taking advantage of the difference in boiling points. Alternatively, the epoxy compound as the stabilizer may be added to the reacted solution after the reaction, and the solution may be supplied for solidifying into an extruder with vents equipped with an aspirator to remove the solvent, and the solidified product may then be dissolved in any of the aforementioned solvent. The solidification may be performed using publicly known methods, e.g., using an extruder with vents and an in-water cut pelletizer at the outlet of the extruder, and a pelletizer which cuts strand-shaped resins into small pieces.

One preferable embodiment of the present invention may include a waterborne dispersion in which the carboxyl group-containing chlorinated propylene-based random copolymer is dispersed in an aqueous solution. In the present invention, "the waterborne dispersion dispersing/containing the carboxyl group-containing chlorinated propylene-based random copolymer" refers to the one in an emulsion state, and may be obtained by publicly known methods. An example of the method is as follows: the carboxyl group-containing chlorinated propylene-based random copolymer may be thermally melted at about 100° C.; a stabilizer, an organic solvent in a small amount and if necessary a surfactant and a basic substance may be added and melted/kneaded; subsequently 80 to 98° C. water may be added to form a W/O type emulsion; and subsequently the emulsion may be converted into an O/W type emulsion while adding the water. The apparatus to be used for emulsification may be those equipped with an anchor type agitating blade or Maxblend type agitating blade in a cylindrical reactor, or those equipped with high speed agitator such as homogenizer and disperser. Specific examples thereof may be Harmotec (supplied from M-Technique), Hivis Disper Mix (Tokushukika Kogyo Co., Ltd.) and Combimix (Tokushukika Kogyo Co., Ltd.), and a twin-screw extruder. It is also possible to perform emulsification under applied pressure at 100° C. or above using an apparatus such as an autoclave equipped with an agitator.

In the present invention, if a surfactant is used upon emulsification, a stable waterborne dispersion may be obtained. Using the surfactant is particularly preferable in the case of obtaining the high solid waterborne dispersion. Examples of the surfactant may include nonionic surfactant such as polyoxyalkylenealkyl ester, polyoxyalkylenealkyl ether, polyoxyalkylenealkylphenyl ether, sucrose ester, sorbitan alkyl ester, sorbitan fatty acid ester, propylene glycol ester, polyglycerine ester, fatty acid alkanol amide, fatty acid monoglyceride and polyoxyalkylenealkyl amine. An anionic surfactant, a cationic surfactant and an ampholytic surfactant may be used in combination with the nonionic surfactant to enhance the dispersibility of the waterborne dispersion, although the use thereof is limited to a very small amount because such a combination remarkably deteriorates water resistance of the coating film. The type and the amount of the surfactant to be added may be appropriately selected, and the amount is preferably 5 to 30% by weight based on 100% by weight of the carboxyl group-containing chlorinated propylene-based random copolymer. When the amount is not less than 5% by weight, the waterborne dispersion may have good stability. By adjusting the amount to not more than 30% by weight, good water resistance may be obtained.

When the carboxyl group-containing chlorinated propylene-based random copolymer is emulsified by combining the aforementioned surfactant and the basic substance, the carboxyl group may be neutralized with the basic substance to enhance the dispersibility in water. Examples of the basic substance may include sodium hydroxide, potassium hydroxide, sodium carbonate, ammonium carbonate, potassium carbonate, ammonia, methylamine, ethylamine, propylamine, butylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol and morpholine. The type and the amount of the basic substance to be used may be appropriately selected, and are designed so that pH of the waterborne dispersion becomes 6 to 9.5 and preferably 7 to 8.5. When pH is not less than this lower limit, the resulting composition acquires good dispersibility. When pH is not more than this upper limit, dissociation of hydrochloric acid may be prevented.

The solid content of the waterborne dispersion of the present invention may be appropriately adjusted depending on the intended application. The solid content is preferably 5 to 60% by weight because the coating workability is impaired when the concentration of the dispersion is too high and too low.

An average particle diameter of the resin component dispersed in the waterborne dispersion of the present invention may preferably be adjusted to 300 nm or less, and more preferably to 200 nm or less. When the particle diameter is the above lower limit, the stability of the waterborne dispersion stored at high and low temperature is enhanced, and the increase of the viscosity and two layer separation in the waterborne dispersion may be prevented. It is possible to infinitely reduce the particle diameter, but it is generally necessary to increase the amount of the emulsifier to be added. However, when the amount of the added emulsifier is too large, it is likely to lower coating film properties such as adhesion strength to substrates, water resistance and gasohol-resistance. Thus, it is desirable to set up the lower limit of the average particle diameter to the extent that the coating film properties are not lowered by adding the emulsifier. The average particle diameter shown in the present invention is the value obtained by measuring particle size distribution using a Zetasizer.

The viscosity of the waterborne dispersion in the present invention is adjusted to preferably 200 mPa·s or less and more preferably 100 mPa·s or less. When the viscosity is not more than this upper limit, good stability of the waterborne dispersion stored at high and low temperature may be obtained, and increase of the viscosity and two layer separation in the waterborne dispersion may be prevented. In addition, the composition easily gives a uniform coating film upon spray-coated. The viscosity of the waterborne dispersion in the present invention is defined by the value obtained by measuring the waterborne dispersion regulated at 25° C. in a thermostatic bath, using a Brookfield viscometer (supplied from Tokyo Keiki Co., Ltd.) and using #1 or #2 rotor at a rotational frequency of 60 rpm.

In the waterborne dispersion of the present invention, the particle diameter is correlated with the viscosity, and the larger the particles are, the viscosity tends to increase. The smaller these values are, the better the properties required for the water-dispersion become.

The copolymer according to the present invention, and the organic solventborne and waterborne composition containing this may be used as paints, printing inks, adhesives and primers applicable to polyolefin-based, vinyl chloride-based, polycarbonate-based, PET-based, ABS-based and nylon-based films, sheets and configured articles. Although the copolymer, and the organic solventborne or waterborne composition containing the same as they are may be used for coating, other additives such as solvents, pigments and other additives may be added thereto within the range in which the effects of the present invention are not impaired. The composition alone exhibits the well-balanced coating film properties. However, if necessary, cyclized rubbers, petroleum resins, coumarone-indene resins, chlorinated polyolefin resins, acryl resins, alkyd resins and the like may be further added. In particular, it is preferable to contain the resin composition of the present invention at 30% by weight or more.

The waterborne dispersion of the present invention may be used as primers, paints, inks and adhesives which are applicable to the polyolefin-based films, sheets and configured articles. Although the dispersion as it is may be used for coating, solvents for accelerating drying speed, pigments, and other additives such as viscosity modifier, primary anti-rusts, anti-foaming agents, wettability modifier, fluid aids and anti-fungal agents may be added in amounts required within the range in which the effects of the present invention are not impaired. The coating film obtained from the waterborne dispersion alone exhibits the well-balanced properties. However, if necessary, other waterborne resins, e.g., waterborne polyurethane resins, waterborne block isocyanate, waterborne epoxy resins, waterborne acrylic resins, waterborne phenol resins, waterborne amino resins, waterborne alkyd resins, waterborne chlorinated rubbers, waterborne silicone resins and the like may be added.

Since the copolymer of the present invention and the resin composition containing the same have the aforementioned properties, they are extremely useful as primers, etc. for resin substrates, particularly polyolefin substrates to which a paint poorly adheres. For example, the copolymer or the resin composition of the present invention is applied onto the surface of polyolefin substrate to form the primer layer, and a paint is applied thereon. The resulting configured article is excellent in adhesion stability.

An example of the configured article having the resin as the substrate is a bumper for automobiles. As to the bumper for the automobile, demands for gasohol resistance and gasoline resistance are particularly crucial. The modified polyolefin resin of the present invention is excellent in performances such as gasohol resistance and gasoline resistance in addition to adhesion strength as explained above. Thus the configured article of the present invention can be a bumper for automobiles which is excellent in these performances. In addition, in the production of the bumpers, there is a strong demand for low temperature baking in order to reduce the cost. The aforementioned configured article of the present invention exerts the excellent performance such as adhesion strength in the low temperature baking, which enables cost saving. In the recent years, consideration for the environment is also particularly required. The environment-minded production may be performed with the copolymer of the present invention because of its excellent adhesion strength when formulated as the waterborne resin composition.

In the combination with the copolymer of the present invention, materials for a configured resin substrate may preferably include polyolefin resins, vinyl chloride resins, polycarbonate resins, polyethylene terephthalate resins, acrylonitrile butadiene styrene resins and nylon resins.

In the configured resin article of the present invention, a coating film layer comprising one or more chlorinated propylene-based random copolymer selected from the group consisting of aforementioned (A) and (B) of the present invention, and the paint component is provided onto the resin substrate. The copolymer of (A) and (B) may be used alone or in combination. The coating film layer may be formed of the mixture of the above components. In other embodiments, the coating film layer may be formed by separately forming the primer layer formed of the copolymer of the present invention and a paint component layer formed of the paint component.

The chlorinated propylene copolymer or the composition comprising this of the present invention is suitable for adhesive treatment at low temperature in the application as the adhesives, the primers and the binders because they exhibit adhesion strength to substrates at low temperature. Particularly in the application as the primers, because of strong demand of the low temperature baking in the recent years, the present invention has the desirable properties particularly in the application as the primers. As used herein, "baking" means a thermal treatment performed to facilitate the drying of the coating film formed by applying the solution containing the resin component at higher temperature than room temperature, for obtaining excellent adhesion strength to the substrate in the application mainly as the primer. In the recent years, the treatment temperature upon baking tends to lower from conventional 120° C. to 80° C. and further 60° C. or even below. As used herein, the "low temperature baking" refers to a baking at low temperature of 80° C. or below. When the low temperature baking is performed using the composition comprising the chlorinated propylene copolymer of the present invention, the composition exhibits the excellent properties even at 80° C. or below, further exhibits the properties at 60° C. or below commensurate with at the higher, and satisfies the request for lowering the baking temperature as well as may keep the nature of the formed coating film well. Generally, in the low temperature baking, adhesion strength of the copolymer to the substrate is significantly deteriorated, but the chlorinated propylene copolymer or the composition comprising the same of the present invention exhibits the excellent properties to various substrates even in the low temperature baking conditions.

EXAMPLES

The present invention will be more specifically described below with reference to the Examples, but the invention is not limited thereto.

Example 1

Organic Solventborne 500 g of a propylene-based random copolymer (Tm=80° C., melt viscosity at 170° C.: 3000 mPa·s) produced using a metallocene catalyst as a polymerization catalyst was placed in a glass-lined reaction tank. The copolymer was chlorinated by adding 5 L of chloroform and bubbling gaseous chlorine from the reaction tank bottom under pressure of 2 kg/cm$^2$ while irradiating ultraviolet ray. Fractions were taken out during the reaction for controlling chlorine content. Then chloroform which was the solvent was removed using an evaporator. Subsequently, the solvent was replaced with toluene/cyclohexane=70/30 (weight ratio), Epicoat 828 (supplied from Yuka Shell Epoxy KK) was added as a stabilizer at 2.0% by weight relative to the resin. The resin content of the resulting solution was adjusted to be 20% by weight, and chlorinated propylene-based random copolymer resin solutions of Examples 1-1 to 1-3 in which the chlorine content was altered as shown in Table 1 were yielded.

Example 2

Organic Solventborne 700 g of the propylene-based random copolymer (Tm=80° C., melt viscosity at 170° C.: 3000 mPa·s) produced using a metallocene catalyst as a polymerization catalyst, 20 g of maleic anhydride and 15 g of dicumyl peroxide were mixed in advance, and dropped into a twin-screw extruder with L/D=34 and φ=40 mm. Residence time was set for 10 minutes. The temperature of all barrels was set at 180° C. (first barrel to seventh barrel) to react, and the seventh barrel was equipped with a deaerator to remove unreacted maleic anhydnde to yield a maleic anhydride-modified propylene-based random copolymer. 500 g of this resin was placed in the glass-lined reaction tank, and the resin compositions were prepared by chlorinating the resin in the same way as in Example 1, to yield chlorinated propylene-based random copolymer resin solutions of Examples 2-1 to 2-3 in which the chlorine content was altered as shown in Table 1.

Example 3

Organic Solventborne 700 g of a propylene-based random copolymer (Tm=92° C., melt viscosity at 170° C.: about 4100 mPa·s) produced using a metallocene catalyst as a polymerization catalyst and 15 g of dicumyl peroxide were mixed in advance, and dropped into the twin-screw extruder with L/D=34 and φ4=40. Residence time was set for 15 minutes. The temperature of all barrels was set at 180° C. (first barrel to seventh barrel), and a propylene-based random copolymer whose molecular weight and molecular weight distribution were adjusted by thermal kneading was yielded. 500 g of this resin was placed in the glass-lined reaction tank, and chlorinated in the same way as in Example 1. After chlorination, resin compositions were prepared using ethyl acetate in place of toluene as the solvent to yield chlorinated propylene-based random copolymer resin solutions of Examples 3-1 to 3-3 in which the chlorine content was altered as shown in Table 1.

Example 4

Organic Solventborne

The thermal kneading was performed in the same way as in Example 3 and the chlorination was performed in the same way as in Example 1 except for using a propylene-based random copolymer (Tm=90° C., melt viscosity at 170° C.: about 10,000 mPa·s) produced using a metallocene catalyst as a polymerization catalyst. After chlorination, resin compositions were prepared using ethyl acetate in place of toluene as the solvent to yield chlorinated propylene-based random copolymer resin solutions of Examples 4-1 to 4-3 in which the chlorine content was altered as shown in Table 1.

Comparative Example 1

Organic Solventborne

A propylene-based random copolymer (MFR=2.0 g/10 minutes, Tm=125° C.) produced using a metallocene catalyst as a polymerization catalyst was dropped into the twin-screw extruder in which the barrel temperature had been set at 330° C., and thermally kneaded to yield a propylene-based random copolymer having the melt viscosity of about 1700 mPa·s at 190° C. 500 g of this resin was placed in the glass-lined reaction tank, and resin compositions were prepared in the same way as in Example 1 to yield chlorinated propylene-based random copolymer resin solutions of Comparative Examples 1-1 to 1-2 in which the chlorine content was altered as shown in Table 1.

Comparative Example 2

Organic Solventborne

A propylene-based random copolymer (MFR=2.0 g/10 minutes, Tm=125° C.) produced using a metallocene catalyst as a polymerization catalyst was dropped into the twin-screw extruder in which the barrel temperature had been set at 350° C., and thermally kneaded to yield a propylene-based random copolymer having the melt viscosity of about 1500 mPa·s at 190° C. Resin compositions were prepared by modifying this resin with maleic anhydride and chlorinating in the same way as in Example 2 to yield chlorinated propylene-based random copolymer resin solutions of Comparative Examples 2-1 to 2-3 in which the chlorine content was altered as shown in Table 1.

<Methods for Measuring Properties of Resins>

For the resins and the solutions containing them obtained in Examples and Comparative Examples, MFR and the melting point (Tm) were measured by the following methods, and the results were shown in Table 1.

MRF (melt flow rate): measured by the melt flow rate measurement stipulated in JIS-K6758 polypropylene test method (conditions: 230° C., 2.16 kgf weight).

Melting point (Tm): determined under the following condition using a DSC measurement apparatus supplied from Seiko Denshi Kogyo Co., Ltd., and about 5 to 15 mg of samples.

<DSC Measurement Conditions>

Preheating: 30° C.→rising temperature (30° C./minute)→200° C.

Cooling: 200° C.→lowering temperature (−20° C./minute: liquid nitrogen)→1-30° C. (retained for 5 minutes)

Main measurement: −30° C.→rising temperature (10° C./minute)→200° C.

Chlorine content: measured in accordance with the method stipulated in JIS-K7229.

Weight average molecular weight (Mw) and number average molecular weight (Mn): measured by GPC (standard substance; polystyrene resin). Mw/Mn in the table represents the dispersion degree.

<Liquid State Test>

The resin solutions obtained in Examples and Comparative Examples were left stand at room temperature for a month, and the liquid state and appearance were visually evaluated. The results are shown in Table 1. A: no change in liquid state and appearance, B: increased viscosity, and C: gelated.

an air-compressed spray gun. The coated film thickness was adjusted to be about 10 μm. Subsequently, a two-liquid type polyurethane paint was sprayed (film thickness: about 30 μm). The paint was dried at 60° C. for 30 minutes, and the plaques were left stand at room temperature for 24 hours. Then, adhesion strength, gasohol resistance and water resistance were evaluated in accordance with the following methods. The results are shown in Table 2.

Adhesion strength: On the coated surface, crosshatched pattern with 100 squares (1 mm in each line) was cut to a degree that cross cut pattern reached the coated base. A cellophane adhesive tape was tightly adhered thereon,

TABLE 1

Properties and liquid state test of binder resin

|  | Chlorine content (wt %) | Maleic anhydride (wt %) based on chlorinated resin | Mw | Mw/Mn | Liquid state (after one month) | Solvent for dissolving resin |
|---|---|---|---|---|---|---|
| Ex. 1-1 | 7.1 | — | 51,000 | 1.90 | A | Toluene/cyclohexane = 70/30 |
| -2 | 15.0 | — | 52,000 | 1.91 | A |  |
| -3 | 21.2 | — | 50,000 | 1.90 | A |  |
| Ex. 2-1 | 5.0 | 3.6 | 49,000 | 1.94 | A | Toluene/cyclohexane = 70/30 |
| -2 | 12.5 | 3.0 | 48,000 | 1.92 | A |  |
| -3 | 20.1 | 2.9 | 50,000 | 1.93 | A |  |
| Ex. 3-1 | 7.0 | — | 53,000 | 1.94 | A | Ethyl acetate/ cyclohexane = 70/30 |
| -2 | 15.2 | — | 53,000 | 1.95 | A |  |
| -3 | 20.9 | — | 53,000 | 1.96 | A |  |
| Ex. 4-1 | 7.5 | — | 78,000 | 1.90 | A | Ethyl acetate/ cyclohexane = 70/30 |
| -2 | 16.0 | — | 77,000 | 1.93 | A |  |
| -3 | 21.0 | — | 80,000 | 1.97 | A |  |
| Comp. Ex. 1-1 | 14.3 | — | — | — | C | Toluene/cyclohexane = 70/30 |
| -2 | 20.1 | — | 80,000 | 1.97 | A |  |
| Comp. Ex. 2-1 | 7.1 | 3.5 | — | — | C | Toluene/cyclohexane = 70/30 |
| -2 | 14.6 | 3.5 | 81,000 | 1.94 | B |  |
| -3 | 22.0 | 3.4 | 82,000 | 1.92 | A |  |

Note:
molecular weights of Comparative Examples 1-1 and 2-1 were not measurable since the resin solution right after production was in a hard gel state.

<Primer Application Test>

100 g of the resin solution (solid content: 20% by weight) obtained in Examples and Comparative Examples and 20 g of titanium dioxide were kneaded in a sand mill for 3 hours, subsequently the viscosity was adjusted with xylene to be 13 to 15 seconds at 20° C. in a #4 Ford cup, and then the solution was painted on an ultrahigh modulus polypropylene plate (brand name: TX-933A supplied from Mitsubishi Chemical Corporation), vinyl chloride, polycarbonate (PC), polyethylene terephthalate (PET), ABS resin and nylon 6 plates using and the extent of remaining film was evaluated after peeling off the tape in 180° direction.

Gasohol resistance: The painted plate was soaked in regular gasoline/ethanol=9/1 (v/v) for 120 minutes, and the coating film was observed. Good: no abnormality on coating film, Defect: abnormality on coating film.

Water resistance: The painted plate was soaked in warm water at 40° C. for 240 hours, and the state of coating film and adhesion strength were examined. Good: no peeling at all, Defect: peeling occurred

TABLE 2

Primer application test results

|  | Substrate | | | | | | | |
|---|---|---|---|---|---|---|---|---|
|  | Polypropylene | | | Polyvinyl chloride | Polycarbonate | Polyethylene terephthalate | ABS resin | Nylon |
|  | Adhesion strength (/100) | Gasohol resistance | Water resistance | Adhesion strength (/100) | Adhesion strength (/100) | Adhesion strength (/100) | Adhesion strength (/100) | Adhesion strength (/100) |
| Ex. 1-1 | 100 | Good | Good | 100 | 100 | 100 | 100 | 100 |
| -2 | 100 | Good | Good | 100 | 100 | 100 | 100 | 100 |
| -3 | 100 | Good | Good | 100 | 100 | 100 | 100 | 100 |

TABLE 2-continued

Primer application test results

| | | Polypropylene | | | Polyvinyl chloride | Polycarbonate | Polyethylene terephthalate | ABS resin | Nylon |
|---|---|---|---|---|---|---|---|---|---|
| | | Adhesion strength (/100) | Gasohol resistance | Water resistance | Adhesion strength (/100) | Adhesion strength (/100) | Adhesion strength (/100) | Adhesion strength (/100) | Adhesion strength (/100) |
| Ex. 2-1 | | 100 | Good | Good | 100 | 100 | 100 | 100 | 100 |
| -2 | | 100 | Good | Good | 100 | 100 | 100 | 100 | 100 |
| -3 | | 100 | Good | Good | 100 | 100 | 100 | 100 | 100 |
| Ex. 3-1 | | 100 | Good | Good | 100 | 100 | 100 | 100 | 100 |
| -2 | | 100 | Good | Good | 100 | 100 | 100 | 100 | 100 |
| -3 | | 100 | Good | Good | 100 | 100 | 100 | 100 | 100 |
| Ex. 4-1 | | 100 | Good | Good | 100 | 100 | 100 | 100 | 100 |
| -2 | | 100 | Good | Good | 100 | 100 | 100 | 100 | 100 |
| -3 | | 100 | Good | Good | 100 | 100 | 100 | 100 | 100 |
| Comp. Ex. | 1-2 | 70 | Defect | Defect | 40 | 30 | 0 | 40 | 0 |
| Comp. Ex. | 2-2 | 70 | Defect | Defect | 50 | 30 | 0 | 70 | 0 |
| | -3 | 60 | Defect | Defect | 30 | 10 | 0 | 50 | 0 |

Note:
Tests of Comparative Examples 1-1 and 2-1 were not conducted since the resin solution right after production was in a hard gel state.

<Adhesion Strength Test>

As an adhesion strength test of the resins obtained in Examples and Comparative Examples, a heat seal test was performed.

Heat seal test: The resultant resin solution (solid content: 20% by weight) was applied onto an untreated polypropylene substrate, a vinyl chloride substrate and a polyethylene terephthalate substrate using #14 coating rod. After dried at room temperature for 24 hours, uncoated side of the same film was put onto the coated side respectively. Then the prepared double-layered films were heat sealed under the pressure bonding conditions of 1 kg/cm$^2$, 60° C., and 3 seconds. After 24 hours, peeling strength in 180° direction (gf/cm) was measured (tensile speed: 50 mm/minute) using Tensilon. The results are shown in Table 3.

TABLE 3

Adhesion strength test results

Heat seal strength (gf/cm)

| | | Polypropylene substrate | Polyinyl chloride substrate | Polyethylene terephthalate substrate |
|---|---|---|---|---|
| Ex. | 1-1 | 860 | 830 | 830 |
| | -2 | 780 | 770 | 750 |
| | -3 | 690 | 710 | 650 |
| Ex. | 2-1 | 1300 | 1200 | 1200 |
| | -2 | 1100 | 1000 | 1000 |
| | -3 | 900 | 1050 | 900 |
| Ex. | 3-1 | 1000 | 980 | 1010 |
| | -2 | 950 | 900 | 920 |
| | -3 | 900 | 890 | 880 |
| Ex. | 4-1 | 1100 | 1120 | 1010 |
| | -2 | 1090 | 980 | 1000 |
| | -3 | 990 | 970 | 920 |
| Comp. Ex. | 1-2 | 200 | 80 | 30 |

TABLE 3-continued

Adhesion strength test results

Heat seal strength (gf/cm)

| | | Polypropylene substrate | Polyinyl chloride substrate | Polyethylene terephthalate substrate |
|---|---|---|---|---|
| Comp. Ex. | 2-2 | 300 | 100 | 40 |
| | -3 | 200 | 60 | 30 |

Note:
Tests of Comparative Examples 1-1 and 2-1 were not conducted since the resin solution right after production was in a hard gel state.

<Ink Test>

100 g of the resin solution (solid content: 20% by weight) obtained in Examples and Comparative Examples shown in the above Table 1 and 20 g of titanium dioxide were kneaded in the sand mill for 3 hours, and then diluted with toluene so that the viscosity was adjusted to 25 to 30 seconds at 20° C. in #3 Zahn cup, to prepare an ink. The resulting ink was subjected to the adhesive tape peeling test and heat seal test. The results are shown in Table 4.

Adhesive-tape-peeling test: In the same way as in the heat seal test, the ink was applied onto the untreated polypropylene substrate, vinyl chloride substrate and polyethylene terephthalate substrate. After drying for 24 hours at room temperature, a cellophane adhesive tape was attached onto the coated side, and the tape was swiftly peeled off. The surface appearance of the coated side was then examined. Good: No peeling observed, Bad: Peeling observed.

Heat seal test: performed in the same way as in the adhesion strength test.

TABLE 4

|  | Ink test results | | | | | |
| --- | --- | --- | --- | --- | --- | --- |
|  | Adhesive tape peeling | | | Heat seal strength (gf/cm) | | |
|  | Polypropylene substrate | Polyvinyl chloride substrate | Polyethylene terephthalate substrate | Polypropylene substrate | Polyvinyl chloride substrate | Polyethylene terephthalate substrate |
| Ex. 1-1 | Good | Good | Good | 650 | 680 | 630 |
| -2 | Good | Good | Good | 590 | 600 | 530 |
| -3 | Good | Good | Good | 450 | 460 | 420 |
| Ex. 2-1 | Good | Good | Good | 1000 | 1100 | 1100 |
| -2 | Good | Good | Good | 920 | 1050 | 1000 |
| -3 | Good | Good | Good | 780 | 1000 | 950 |
| Ex. 3-1 | Good | Good | Good | 890 | 930 | 850 |
| -2 | Good | Good | Good | 790 | 810 | 780 |
| -3 | Good | Good | Good | 650 | 660 | 650 |
| Ex. 4-1 | Good | Good | Good | 990 | 980 | 950 |
| -2 | Good | Good | Good | 910 | 920 | 840 |
| -3 | Good | Good | Good | 760 | 770 | 720 |
| Comp. Ex. 1-2 | Bad | Bad | Bad | 180 | 100 | 30 |
| Comp. Ex. 2-2 | Bad | Bad | Bad | 250 | 150 | 70 |
| -3 | Bad | Bad | Bad | 200 | 110 | 40 |

Note:
Tests of Comparative Examples 1-1 and 2-1 were not conducted since the resin solution right after production was in a hard gel state.

The chlorinated propylene-based random copolymers in Examples 1-1 to 4-3 were excellent in solution conditions, and exhibited excellent performances in any of the primer application test, the adhesion strength test and the ink test. On the contrary, the chlorinated propylene-based random copolymers in Comparative Examples 1-1, 2-1 and 2-2 were inferior in solution condition, and the chlorinated propylene-based random copolymers in Comparative Examples 1-2, 2-2 and 2-3 were inferior in all performances of the primer application suitability, the adhesion strength and the ink application suitability.

<Production Example of Copolymer 1> (Waterborne)

100 parts by weight of a propylene-based random copolymer (Tm=80° C., melt viscosity at 170° C.: about 3200 mPa·s) produced using a metallocene catalyst as a polymerization catalyst, 4 parts by weight of powder maleic anhydride (supplied from NOF Corporation) and 2 parts by weight of di-t-butyl peroxide were kneaded. Subsequently, in order to yield a maleic anhydride-modified propylene-based random copolymer the mixture was dropped into the twin-screw extruder (L/D=60, φ 15 mm, first barrel to eighth barrel), reacted under the conditions of the residence time for 5 minutes, the rotational frequency at 300 rpm and the barrel temperatures at 120° C. (first and second barrels), 180° C. (third and forth barrels), 100° C. (fifth barrel) and 130° C. (sixth to eighth barrels), and a reduced pressure treatment was performed in the sixth, seventh and eighth barrels. 2 kg of this resin was placed in 50 L glass-lined reaction tank, and 20 L of chloroform was added thereto. Chlorination was then performed by bubbling gaseous chlorine from the reaction tank bottom under pressure of 2 kg/cm² while irradiating ultraviolet ray. Fractions were taken out during the reaction, and the solvent chloroform was removed using the evaporator. The solid content of the resulting solution was adjusted to about 30% by weight. 1.5 parts by weight of stabilizer (t-butylphenylglycidyl ether) based on 100 parts by weight of the resin was added to this chloroform solution, which was then supplied into the twin-screw extruder (L/D=34, φ+40 mm, first barrel to seventh barrel). The reaction solution was solidified under the conditions of the residence time for 10 minutes, the rotational frequency at 50 rpm and the barrel temperatures at 90° C. (first to sixth barrels) and 70° C. (seventh barrel). The reduced pressure treatment was performed in the first, fourth, fifth and sixth barrels. As a result, a maleic anhydride-modified chlorinated propylene-based random copolymer was obtained.

<Production Example of Copolymer 2> (Waterborne)

A maleic anhydride-modified chlorinated propylene-based random copolymer was yielded in accordance with Production Example 1 except for using a propylene-based random copolymer (MFR=2.0 g/10 minutes, Tm=125° C.) produced using a metallocene catalyst as a polymerization catalyst.

For the resins produced in Production Examples 1 and 2, the following properties (Mw, chlorine content, amount of grafted maleic anhydride) were measured. The results are shown in Table 5.

Example 5

200 g of each maleic anhydride-modified chlorinated propylene-based random copolymer obtained in the Production Example 1, 40 g of surfactant (brand name: Ethomeen T/25 supplied from Lion Corporation), 7 g of stabilizer (stearyiglycidyl ether) and 38 g of xylene were put into a four-necked flask equipped with a stirrer, a cooling tube, a thermometer and a dropping funnel, and kneaded at 120° C. for 30 minutes. Subsequently, 6 g of 2-amino-2-methyl-1-propanol was added over 5 minutes, retained for 5 minutes and then 970 g of 90° C. water was added over 40 minutes. After retained for 10 minutes, xylene was removed under the reduced pressure, and the reaction mixture was cooled down to room temperature with stirring. Finally, ion-exchange water was added so that the solid content was 30% by weight, to yield a waterborne dispersion. The viscosity of the resultant waterborne dispersion and the average particle diameter of the resin component in the waterborne dispersion were measured. The results are shown in Table 5.

Comparative Examples 3-1 to 3-3

A waterborne dispersion was prepared in the same way as in Example 3 except for using the maleic anhydride-modified chlorinated propylene-based random copolymer obtained in the Production Example 2. The viscosity of the resultant waterborne dispersion and the average particle diameter of the resin component in the waterborne dispersion were measured. The results are shown in Table 5.

<Methods for Measuring Properties>

MRF (melt flow rate): measured by the melt flow rate measurement (conditions: 230° C., weighted: 21.2 N (2.16 kgf)) as stipulated in JIS-K6758.

Melting point (Tm): determined under the following conditions using a DSC measurement apparatus supplied from Seiko Denshi Kogyo Co., Ltd., and about 5 to 15 mg of samples.

<DSC Measurement Condition>

Preheating: 30° C.→rising temperature (30° C./minute)→200° C.

Cooling: 200° C.→lowering temperature (−20° C./minute: liquid nitrogen)→−30° C. (retained for 5 minutes)

Main measurement: −30° C.→rising temperature (10° C./minute)→200° C.

Chlorine content: measured in accordance with the method stipulated in JIS-K7229.

Weight average molecular weight (Mw): measured by GPC (standard substance; polystyrene resin).

Graft amount of unsaturated carboxylic acid or anhydride thereof: calculated by alkali titration method.

Viscosity: measured using a Brookfield viscometer and #1 or #2 rotor at a rotational frequency of 60 rpm.

Average particle diameter: measured using a Zetasizer (Sysmex Corporation).

TABLE 5

Brookfield viscosity and average particle diameter of waterborne dispersion

| | | Mw | Chlorine content (%) | Amount of grafted maleic anhydride (based on chlorinated resin, wt %) | Brookfield viscosity (mPa·s) | Average particle diameter (nm) |
|---|---|---|---|---|---|---|
| Ex. | 5-1 | 47,000 | 7.1 | 2.4 | 32 | 120 |
| | 5-2 | | 11.3 | 2.2 | 28 | 110 |
| | 5-3 | | 15.2 | 2.1 | 19 | 95 |
| Comp. Ex. | 3-1 | 80,000 | 7.7 | 2.8 | 90 | 230 |
| | 3-2 | | 12.0 | 2.7 | 35 | 150 |
| | 3-3 | | 16.0 | 2.5 | 30 | 120 |

<Performance Test>

In order to improve wettability of the waterborne dispersions, 1.5% by weight (relative to the waterborne dispersion) of an aqueous solution of 1% Surflon S-141 (supplied from Seimi Chemical Co., Ltd.) was added to each of the waterborne dispersion of the maleic anhydride-modified chlorinated propylene-based random copolymer obtained in Examples 5-1 to 5-3 and Comparative Examples 3-1 to 3-3. Then the following heat seal test, primer application test and adhesion strength test to various substrates were performed.

<Heat Seal Test>

On an elongated polypropylene film treated by corona surface treatment, the sample was applied using a #8 Meyre bar, and dried at room temperature for 15 hours. Uncoated side of the same films was put onto the coated side. Then, the prepared double-layered films were heat-sealed using No. 276 heat seal tester (Yasuda Seiki Seisakusyo Ltd.) under the conditions of 1.5 kg/cm$^2$, 60° C., and 10 seconds. The resultant test piece was cut into 1 cm width, and peeled using a tension tester with the load of 5 kg at the tensile speed of 100 mm/minute, and peel strength was measured. The test was repeated three times, and an average value was taken as a result. The results are shown in Table 6.

<Primer Application Test>

The waterborne dispersion was sprayed onto an ultrahigh-modulus polypropylene plate (brand name: TX-933A supplied from Mitsubishi Chemical Corporation) whose surface had been wiped with isopropanol and baked at 60° C. for 30 minutes. The thickness of the dried coating layer was adjusted in the range of 10 to 15 μm. Then white colored coating paints of two-liquid type were sprayed thereon. The thickness of the dried coating layer was adjusted in the range of 45 to 50 μm. The sample was then left stand at room temperature for 15 minutes, and baked at 60° C. for 30 minutes. A test piece was left stand at room temperature for 3 days. Then the tests for adhesion strength, gasohol resistance and warm water resistance were performed in accordance with the following methods. The results are shown in Table 6.

Adhesion strength: On the coated surface, crosshatched pattern with 100 squares (2 mm in each line) was cut to a degree that cross cut pattern reached the coated base. A cellophane adhesive tape was tightly adhered thereon, and the extent of remaining film was evaluated after peeling off the tape in 180° direction.

Gasohol resistance: The test piece was soaked in regular gasoline/ethanol=9/1 (v/v) for 120 minutes, and then the state of coating layer was observed.

Warm water resistance: The test piece was soaked in warm water at 40° C. for 240 hours, and the state of coating layer and adhesion strength were examined. The state of coating layer was evaluated by the occurrence of blisters, and the adhesion strength was evaluated in accordance with the cross cut test described above.

<Adhesion Strength Test with Various Substrates>

The waterborne dispersion was sprayed on various substrate (vinyl chloride, polycarbonate (PC), polyethylene terephthalate (PET), ABS resin and nylon-6) whose surface had been wiped with isopropanol and baked at 60° C. for 30 minutes. The thickness of the dried coating layer was adjusted in the range of 10 to 15 p$_m$. Then white colored coating paints of two-liquid type were sprayed thereon. The thickness of the dried coating layer was adjusted in the range of 45 to 50 μm, left stand at room temperature for 15 minutes, and baked at 60° C. for 30 minutes. A test piece was left stand at room temperature for 3 days. Subsequently, on the coated surface, crosshatched pattern with 100 squares (1 mm in each line) was cut to a degree that cross cut pattern reached the coated base. A cellophane adhesive tape was tightly adhered thereon, and the extent of remaining film was evaluated after peeling off the tape in 180° direction. The results are shown in Table 7.

TABLE 6

Heat seal strength test and primer application test

| | | Heat seal strength (gf/15 mm) | Primer application test | | | |
|---|---|---|---|---|---|---|
| | | | Adhesion strength | Gasohol resistance | Warm water resistance (surface state) | Warm water resistance (adhesion) |
| Ex. | 5-1 | 1200 | 100/100 | No problem | No problem | 100/100 |
| | 5-2 | 900 | 100/100 | No problem | No problem | 100/100 |
| | 5-3 | 840 | 100/100 | No problem | No problem | 100/100 |
| Comp. Ex. | 3-1 | 250 | 80/100 | Peeled at 15 min. | With blisters | 40/100 |
| | 3-2 | 200 | 40/100 | Peeled at 11 min. | With blisters | 30/100 |
| | 3-3 | 160 | 20/100 | Peeled at 3 min | With blisters | 10/100 |

TABLE 7

Adhesion strength test with various substrates

| | | Substrate | | | | |
|---|---|---|---|---|---|---|
| | | Vinyl chloride | Poly-carbonate | Polyethylene terephthalate | ABS resin | Nylon |
| Ex. | 5-1 | 100/100 | 100/100 | 100/100 | 100/100 | 100/100 |
| | 5-2 | 100/100 | 100/100 | 100/100 | 100/100 | 100/100 |
| | 5-3 | 100/100 | 100/100 | 100/100 | 100/100 | 100/100 |
| Comp. Ex. | 3-1 | 70/100 | 50/100 | 85/100 | 70/100 | 80/100 |
| | 3-2 | 55/100 | 30/100 | 70/100 | 60/100 | 65/100 |
| | 3-3 | 35/100 | 20/100 | 50/100 | 40/100 | 50/100 |

The waterborne dispersions of the carboxyl group-containing chlorinated propylene-based random copolymer in Examples 5-1 to 5-3 had excellent heat seal strength and exhibited the excellent performance in the primer application test, as well as excellent adhesion strength to various substrates. On the contrary, the waterborne dispersions of the carboxyl group-containing chlorinated propylene-based random copolymer in Comparative Examples 3-1 to 3-3 were largely inferior in performance in all of the properties.

What is claimed is:

1. A chlorinated propylene-based random copolymer obtained by chlorinating a propylene-based random copolymer:

said propylene-based random copolymer being obtained by copolymerizing propylene with one or more other α-olefins using a metallocene catalyst as a polymerization catalyst; and said propylene-based random copolymer having a melting point (Tm) of 92° C. or lower when measured using a differential scanning calorimeter (DSC), wherein said propylene-based random copolymer is chlorinated after lowering a molecular weight thereof by heating at not less than the melting point of the propylene-based random copolymer and not more than 350° C.

2. The chlorinated propylene-based random copolymer according to claim 1 wherein said propylene-based random copolymer is graft-copolymerized with α,β-unsaturated carboxylic acid and/or anhydride thereof so that a graft amount is 0.1 to 20% by weight.

3. The chlorinated propylene-based random copolymer according to claim 2 wherein the copolymer after said graft copolymerization is chlorinated.

4. The chlorinated propylene-based random copolymer according to claim 1 wherein a chlorine content thereof is 2 to 35% by weight.

5. The chlorinated propylene-based random copolymer according to claim 1 having a weight average molecular weight of 3,000 to 250,000.

6. An adhesive comprising the chlorinated propylene-based random copolymer according to claim 1.

7. A primer comprising the chlorinated propylene-based random copolymer according to claim 1.

8. A binder comprising the chlorinated propylene-based random copolymer according to claim 1.

9. A binder for an ink comprising the chlorinated propylene-based random copolymer according to claim 1.

10. An organic solventborne resin composition comprising the chlorinated propylene-based random copolymer according to claim 1, a stabilizer and an organic solvent.

11. A waterborne resin composition comprising the chlorinated propylene-based random copolymer according to claim 1, water and a surfactant.

12. A configured resin article comprising a configured resin substrate and a coating film layer, said layer containing one or more chlorinated propylene-based random copolymers selected from the group consisting of the following (A) and (B), and a paint component:

(A) a chlorinated propylene-based random copolymer obtained by chlorinating a propylene-based random copolymer, said propylene-based random copolymer being obtained by copolymerizing propylene with one or more other α-olefins using a metallocene catalyst as a polymerization catalyst, and said propylene-based random copolymer having a melting point (Tm) of 92° C. or lower when measured using a differential scanning calorimeter (DSC); and (B) the chlorinated propylene-based random copolymer of (A) having a molecular structure in which α,β-unsaturated carboxylic acid and/or anhydride thereof has been graft-copolymerized so that a graft amount is 0.1 to 20% by weight, wherein said propylene-based random copolymer is chlorinated after lowering a molecular weight thereof by heating at not less than the melting point of the propylene-based random copolymer and not more than 350° C.

13. The configured resin article according to claim 12 wherein said coating film layer is a laminated article comprising a primer layer formed of the chlorinated propylene-based random copolymer selected from the group consisting of said (A) and (B), and a paint component layer formed of the paint component.

14. The configured resin article according to claim 12 wherein said configured resin substrate is a substrate formed of a resin selected from the group consisting of polyolefin resins, vinyl chloride resins, polycarbonate resins, polyethylene terephthalate resins, acrylonitrile butadiene styrene resins and nylon resins.

15. A method for producing a chlorinated propylene-based random copolymer comprising:
  copolymerizing propylene with one or more other α-olefins using a metallocene catalyst as a polymerization catalyst to obtain a propylene-based random copolymer having a melting point (Tm) of less than 92° C. or lower when measured using a differential scanning calorimeter (DSC); and
  chlorinating said propylene-based random copolymer,
  wherein said propylene-based random copolymer is chlorinated after lowering a molecular weight thereof by heating at not less than the melting point of the propylene-based random copolymer and not more than 350° C.

16. The method for producing a chlorinated propylene-based random copolymer according to claim 15 comprising a step of graft-copolymerizing α,β-unsaturated carboxylic acid and/or anhydride thereof with said propylene-based random copolymer so that a graft amount is 0.1 to 20% by weight, at least before or after said step of chlorinating.

17. A method for low temperature baking wherein a composition comprising the chlorinated propylene-based random copolymer according to any one of claims 1 or 2-5 is applied onto a configured resin substrate and baked at 80° or below.

18. An adhesive comprising the chlorinated propylene-based random copolymer according to claim 2.

19. A primer comprising the chlorinated propylene-based random copolymer according to claim 2.

20. A binder comprising the chlorinated propylene-based random copolymer according to claim 2.

21. A binder for an ink comprising the chlorinated propylene-based random copolymer according to claim 2.

22. An organic solventborne resin composition comprising the chlorinated propylene-based random copolymer according to claim 2, a stabilizer and an organic solvent.

23. An organic solventborne resin composition comprising the chlorinated propylene-based random copolymer according to claim 3, a stabilizer and an organic solvent.

24. An organic solventborne resin composition comprising the chlorinated propylene-based random copolymer according to claim 4, a stabilizer and an organic solvent.

25. An organic solventborne resin composition comprising the chlorinated propylene-based random copolymer according to claim 5, a stabilizer and an organic solvent.

26. A waterborne resin composition comprising the chlorinated propylene-based random copolymer according to claim 2, water and a surfactant.

27. A waterborne resin composition comprising the chlorinated propylene-based random copolymer according to claim 3, water and a surfactant.

28. A waterborne resin composition comprising the chlorinated propylene-based random copolymer according to claim 4, water and a surfactant.

29. A waterborne resin composition comprising the chlorinated propylene-based random copolymer according to claim 5, water and a surfactant.

* * * * *